(No Model.)
W. L. WHITFIELD.
TRACK LIFTER.
No. 504,259. Patented Aug. 29, 1893.
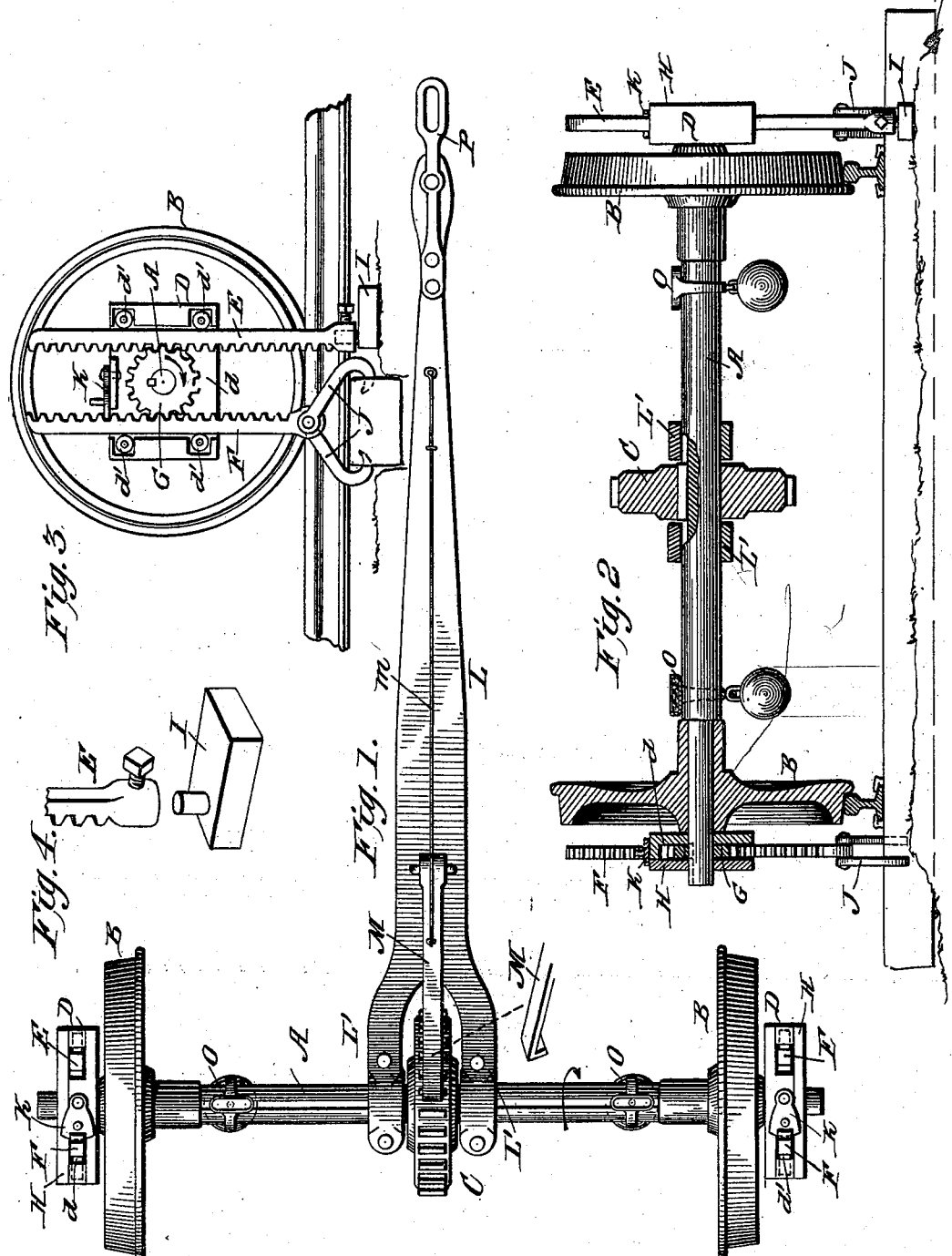
WITNESSES:
Fred G. Dieterich
M. D. Blondel
INVENTOR
William L. Whitfield.
BY Munn & Co
ATTORNEYS.

UNITED STATES PATENT OFFICE.

WILLIAM L. WHITFIELD, OF OCALA, FLORIDA.

TRACK-LIFTER.

SPECIFICATION forming part of Letters Patent No. 504,259, dated August 29, 1893.

Application filed February 8, 1893. Serial No. 461,504. (No model.)

*To all whom it may concern:*

Be it known that I, WILLIAM L. WHITFIELD, residing at Ocala, in the county of Marion and State of Florida, have invented certain new and useful Improvements in Track-Lifters, of which the following is a specification.

My invention relates to that class of track lifters in which the lifting mechanism is supported on a truck frame, and it has for its object to provide a track lifter of this kind simple and inexpensive in its construction, easily manipulated, and very effective for its desired purpose.

The invention consists in the peculiar combination and novel arrangements of parts, all of which will hereinafter be fully described and claimed, reference being had to the accompanying drawings in which—

Figure 1 is a top plan view of my improved track lifter. Fig. 2 is a longitudinal section partly in elevation of the same. Fig. 3 is an end view thereof with the cap plate removed and Fig. 4 is a detail view hereinafter referred to.

Referring to the accompanying drawings A indicates the axle upon which are loosely journaled the track wheels B B, and centrally thereof is keyed a spur gear C.

D indicates square boxes loosely held on the axle on the outside of the wheels, in the outer face of which are formed depressions $d$, in which are held rack bars E and F, one of which E I term the jack bar and the other F the lifting bar. It will be noticed by reference to Fig. 2, that the rack faces of such bars are held in mesh with a gear G fixedly held on the outer end of the axle, while the rear faces of such bars are guided by four friction rollers $d'$ $d'$ held in the box D' which, as well as the rack bars E and F are held in place by a cap plate H.

Upon the lower end of the rack bar E is removably held a foot or rest member I, the construction and means of connection being most clearly shown in Fig. 4.

J J indicate clamp hooks pivotally connected with the lower end of the lifting bar F, and K indicates a pawl on the upper end of the box D adapted to engage the lifting rack bar to hold it to any of its elevated positions.

L indicates the operating lever, the inner end of which has forked ends L' L' which embrace the spur wheel C and are loosely mounted on the axle as shown in Fig. 2.

Upon the lever L is pivoted a pawl M which engages the spur wheel C and with which is connected a rod $m$, for throwing the pawl M out of operative position.

O indicates balanced levels mounted on the axle and P a coupling link secured to the front end of the lever L, for connecting the machine to the back of a car when it is desired to move the machine along the road.

From the foregoing description taken in connection with the drawings, it will be readily seen, that as the lever L is moved down, the wheel C, the axle and the gears G will be rotated in the direction indicated by the arrow in Figs. 1 and 3, and as the gears G are thus rotated, they bear on and form a fulcrum on the jack bar E and travel up on the same and move the lifter bar F up with it, and thereby raise the tie track and the truck. By connecting the shoe to the bottom of the jack bar as shown it is capable of adjustment to different positions relatively to the ties.

Having thus described my invention, what I claim, and desire to secure by Letters Patent, is—

1. An improved track lifter, comprising an axle, truck wheels loosely mounted thereon, a toothed wheel fixedly held on such axle, an operating lever loosely journaled on the axle and engaging the toothed wheel, rack bars arranged in pairs and connections between such bars and the axle substantially as shown whereby a reciprocating movement is imparted to such bars by the rotary movement of the axle, as and for the purpose described.

2. The combination with the axle A, the truck wheels loosely journaled thereon, the toothed wheel C fixedly secured to such axle, and the lever and pawl for operating such wheel C, of a guide frame held on the axle, rack bars held therein, one to each side of the axle, one of such bars having a foot portion and the other a lifting arm, a cog wheel on the axle engaging such rack bars, all substantially as and for the purpose described.

3. The combination with the truck wheels B, the axle A loosely journaled therein, its ends projecting beyond the same and having fixed cog wheels G and the toothed wheel C fixedly held thereon, of the frames D loosely held on the projecting portions of the axle, the rack bars E and F guided therein and engaging the cog wheels G, one of said bars having a foot portion and the other a lifting member, the lever M loosely hung on the axle and having a dog engaging the wheel C all substantially as and for the purpose described.

WILLIAM L. WHITFIELD.

Witnesses:
DAVID L. WOODROW,
BENJ. F. PERRY, Jr.